(12) United States Patent
Forster et al.

(10) Patent No.: US 10,158,161 B2
(45) Date of Patent: Dec. 18, 2018

(54) PRODUCTION LINE FOR MAKING SHORT RUN RADIO FREQUENCY IDENTIFICATION TAGS AND LABELS

(75) Inventors: Ian J. Forster, Essex (GB); Christian K. Oelsner, Simpsonville, SC (US); Robert Revels, Heath Springs, SC (US); Benjamin Kingston, Suwanee, GA (US); Peter Cockerell, Pasadena, CA (US); Norman Howard, Essex (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 13/552,953

(22) Filed: Jul. 19, 2012

(65) Prior Publication Data

US 2012/0280047 A1 Nov. 8, 2012

Related U.S. Application Data (62) Division of application No. 13/160,318, filed on Jun. 14, 2011, now Pat. No. 9,231,290.

(Continued)

(51) Int. Cl.
*H01P 11/00* (2006.01)
*B32B 38/10* (2006.01)
(Continued)

(52) U.S. Cl.
CPC .......... *H01P 11/003* (2013.01); *B23K 26/364* (2015.10); *B32B 38/10* (2013.01);
(Continued)

(58) Field of Classification Search
CPC .............. B23K 26/367; B32B 2305/10; B32B 2307/302; B32B 2317/12; B32B 2519/02; B32B 37/12; B32B 38/10; B32B 38/145; G06K 19/0723; G06K 19/07718; G06K 19/07749; G06K 19/0775
USPC ...... 29/600, 601, 592.1, 840–842, 825, 846; 343/700 MS, 895; 340/572.1–572.4, 340/572.8
See application file for complete search history.

(56) References Cited

U.S. PATENT DOCUMENTS 2,961,746 A  11/1960  Lyman
3,240,647 A   3/1966  Morgan
(Continued)

FOREIGN PATENT DOCUMENTS

CN  101 341 501  12/2006
CN  101300591    11/2008
(Continued)

OTHER PUBLICATIONS

"Finecut Narrow Web Laser Cutting System," Spartanics®, www.spartanics.com, 2 pages, no date shown.
(Continued)

*Primary Examiner* — Minh Trinh
(74) *Attorney, Agent, or Firm* — Avery Dennison Retail Information Services, LLC (57) ABSTRACT

The present invention is a method and apparatus for producing ready to use RFID devices in a convenient and economical manner. The apparatus of the present invention may be collocated with a manufacturer of consumer goods.

7 Claims, 4 Drawing Sheets

Related U.S. Application Data (60) Provisional application No. 61/354,380, filed on Jun. 14, 2010, provisional application No. 61/354,388, filed on Jun. 14, 2010, provisional application No. 61/354,393, filed on Jun. 14, 2010.

(51) Int. Cl.

| | |
|---|---|
| *G06K 19/077* | (2006.01) |
| *G06K 19/07* | (2006.01) |
| *B23K 26/364* | (2014.01) |
| *B32B 37/12* | (2006.01) |
| *B32B 38/00* | (2006.01) |

(52) U.S. Cl.
CPC ..... *G06K 19/0723* (2013.01); *G06K 19/0775* (2013.01); *G06K 19/07718* (2013.01); *G06K 19/07749* (2013.01); *G06K 19/07754* (2013.01); *G06K 19/07786* (2013.01); *B32B 37/12* (2013.01); *B32B 38/145* (2013.01); *B32B 2305/10* (2013.01); *B32B 2307/302* (2013.01); *B32B 2317/12* (2013.01); *B32B 2519/02* (2013.01); *Y10T 29/49016* (2015.01); *Y10T 29/49018* (2015.01); *Y10T 29/49117* (2015.01); *Y10T 29/49156* (2015.01); *Y10T 29/5317* (2015.01); *Y10T 29/53174* (2015.01); *Y10T 156/1052* (2015.01); *Y10T 428/24802* (2015.01); *Y10T 428/24917* (2015.01); *Y10T 428/2809* (2015.01); *Y10T 428/2817* (2015.01)

(56) References Cited

U.S. PATENT DOCUMENTS

| | | | |
|---|---|---|---|
| 3,938,931 A * | 2/1976 | Emmel | 425/505 |
| 4,369,557 A | 1/1983 | Vandebult | |
| 4,664,966 A | 3/1987 | Bailey et al. | |
| 4,711,996 A | 12/1987 | Drexler | |
| 4,717,438 A | 1/1988 | Benge | |
| 4,745,288 A | 5/1988 | Hurley et al. | |
| 4,900,386 A | 2/1990 | Richter-Jorgensen | |
| 5,142,270 A | 8/1992 | Appalucci | |
| 5,161,276 A | 11/1992 | Hutton et al. | |
| 5,331,443 A | 7/1994 | Stanisci | |
| 5,434,917 A | 7/1995 | Naccache et al. | |
| 5,566,441 A * | 10/1996 | Marsh et al. | 29/600 |
| 5,632,842 A | 5/1997 | Oliver | |
| 5,645,932 A | 7/1997 | Uchibori | |
| 5,656,115 A * | 8/1997 | Tanno et al. | 156/270 |
| 5,708,419 A | 1/1998 | Isaacson et al. | |
| 5,709,484 A * | 1/1998 | Dorner | B41J 3/60 347/218 |
| 5,759,422 A | 2/1998 | Schmelzer et al. | |
| 5,725,935 A | 3/1998 | Rajan | |
| 5,751,256 A | 5/1998 | McDonough et al. | |
| 5,754,256 A | 5/1998 | Kim | |
| 5,800,724 A | 9/1998 | Habeger et al. | |
| 5,861,809 A | 1/1999 | Eckstein | |
| 6,072,383 A | 6/2000 | Gallagher, III et al. | |
| 6,100,804 A | 8/2000 | Brady et al. | |
| 6,147,662 A * | 11/2000 | Grabau et al. | 343/895 |
| 6,161,276 A | 12/2000 | Droz | |
| 6,164,551 A | 12/2000 | Altwasser | |
| 6,191,382 B1 | 2/2001 | Damikolas | |
| 6,259,369 B1 | 7/2001 | Monico | |
| 6,265,977 B1 | 7/2001 | Vega et al. | |
| 6,313,747 B2 | 11/2001 | Imaichi et al. | |
| 6,320,556 B1 | 11/2001 | Cyman et al. | |
| 6,333,721 B1 | 12/2001 | Altwasser | |
| 6,352,497 B1 | 3/2002 | Hensley et al. | |
| 6,353,420 B1 | 3/2002 | Chung | |
| 6,400,323 B2 | 6/2002 | Tasukawa et al. | |
| 6,424,315 B1 | 7/2002 | Glenn et al. | |
| 6,451,154 B1 * | 9/2002 | Grabau et al. | 156/300 |
| 6,466,131 B1 | 10/2002 | Tuttle et al. | |
| 6,476,775 B1 | 11/2002 | Oberle | |
| 6,509,837 B1 | 1/2003 | Tuttle et al. | |
| 6,609,844 B1 | 8/2003 | Petteruti et al. | |
| 6,698,116 B2 | 3/2004 | Waldron | |
| 6,781,508 B2 | 8/2004 | Tuttle et al. | |
| 6,836,215 B1 | 12/2004 | Laurash et al. | |
| 6,839,029 B2 | 1/2005 | Mendolia et al. | |
| 6,933,892 B2 | 8/2005 | Oberle | |
| 6,940,408 B2 | 9/2005 | Ferguson et al. | |
| 6,988,666 B2 | 1/2006 | Appalucci et al. | |
| 7,014,729 B2 * | 3/2006 | Grabau et al. | 156/290 |
| 7,047,624 B2 | 5/2006 | Vogt | |
| 7,116,227 B2 | 10/2006 | Eckstein et al. | |
| 7,122,235 B2 | 10/2006 | Bourdelais et al. | |
| 7,176,053 B1 | 2/2007 | Dimmler | |
| 7,224,280 B2 | 5/2007 | Ferguson et al. | |
| 7,245,227 B2 * | 7/2007 | Winter | G06K 19/077 156/379.7 |
| 7,250,868 B2 | 7/2007 | Kurz et al. | |
| 7,256,738 B2 | 8/2007 | Mizukawa et al. | |
| 7,283,035 B2 | 10/2007 | Tuttle et al. | |
| 7,284,704 B2 | 10/2007 | Lubow | |
| 7,300,863 B2 | 11/2007 | Pennaz et al. | |
| 7,309,007 B2 | 12/2007 | Kean | |
| 7,345,575 B2 | 3/2008 | Tuttle et al. | |
| 7,374,095 B2 | 5/2008 | Blank et al. | |
| 7,463,150 B2 | 12/2008 | Rajan | |
| 7,477,194 B2 | 1/2009 | Coleman et al. | |
| 7,497,004 B2 | 3/2009 | Cote et al. | |
| 7,520,001 B2 | 4/2009 | Gotoh et al. | |
| 7,533,455 B2 | 5/2009 | Wehr | |
| 7,546,671 B2 | 6/2009 | Finn | |
| 7,559,131 B2 | 7/2009 | Credelle et al. | |
| 7,621,451 B2 | 11/2009 | Berson | |
| 7,633,035 B2 | 12/2009 | Kirmeier | |
| 7,641,112 B2 | 1/2010 | Jensen et al. | |
| 7,650,683 B2 | 1/2010 | Forster et al. | |
| 7,681,301 B2 | 3/2010 | Rodgers | |
| 7,836,588 B2 | 11/2010 | Laskin et al. | |
| 7,855,645 B2 | 12/2010 | Rajan | |
| 7,893,385 B2 | 2/2011 | Rodgers | |
| 7,930,815 B2 | 4/2011 | Coleman et al. | |
| 7,997,495 B2 | 8/2011 | Rodgers | |
| 8,033,477 B2 | 10/2011 | Jones et al. | |
| 8,132,734 B2 | 3/2012 | Lazarowicz et al. | |
| 8,146,830 B2 | 4/2012 | Johnson et al. | |
| 8,178,028 B2 | 5/2012 | Gandhi | |
| 8,191,230 B2 | 6/2012 | Coleman et al. | |
| 8,202,567 B2 | 6/2012 | Kohnle et al. | |
| 8,786,510 B2 | 7/2014 | Coleman et al. | |
| 8,981,936 B2 | 3/2015 | Forster et al. | |
| 9,039,866 B2 | 5/2015 | Forster et al. | |
| 9,231,290 B2 | 1/2016 | Forster et al. | |
| 2002/0018880 A1 | 2/2002 | Young | |
| 2002/0025416 A1 | 2/2002 | Uchibori | |
| 2003/0051806 A1 | 3/2003 | Appalucci | |
| 2003/0112202 A1 | 6/2003 | Vogt | |
| 2003/0136503 A1 | 7/2003 | Green et al. | |
| 2004/0075616 A1 | 4/2004 | Endo et al. | |
| 2004/0078957 A1 | 4/2004 | Forster et al. | |
| 2004/0177492 A1 | 9/2004 | Eckstein et al. | |
| 2004/0221952 A1 | 11/2004 | Hirschmann et al. | |
| 2004/0224135 A1 | 11/2004 | Krebs | |
| 2005/0001785 A1 | 1/2005 | Ferguson et al. | |
| 2005/0034995 A1 | 2/2005 | Gundlach et al. | |
| 2005/0035927 A1 | 2/2005 | Kimura | |
| 2005/0083627 A1 | 4/2005 | Wang et al. | |
| 2005/0089664 A1 | 4/2005 | Utz | |
| 2005/0183817 A1 | 8/2005 | Eckstein et al. | |
| 2005/0197074 A1 | 9/2005 | Cullen et al. | |
| 2005/0198811 A1 | 9/2005 | Kurz et al. | |
| 2005/0205202 A1 * | 9/2005 | Chaoui | B32B 37/226 156/269 |
| 2005/0206524 A1 | 9/2005 | Forster et al. | |
| 2005/0230486 A1 | 10/2005 | Halope | |
| 2005/0230791 A1 | 10/2005 | Kanda et al. | |
| 2005/0231371 A1 | 10/2005 | Rowe, Jr. | |
| 2005/0274811 A1 | 12/2005 | Zercher | |

(56) References Cited

U.S. PATENT DOCUMENTS

| | | | |
|---|---|---|---|
| 2005/0284917 A1* | 12/2005 | Clare et al. ............ | 228/170 |
| 2005/0284941 A1 | 12/2005 | Lubow | |
| 2006/0244662 A1 | 11/2006 | Bauer | |
| 2007/0020932 A1 | 1/2007 | Maruyama et al. | |
| 2007/0040686 A1 | 2/2007 | Reis | |
| 2007/0078957 A1 | 4/2007 | Ypya | |
| 2007/0094862 A1 | 5/2007 | Posamentier | |
| 2007/0102190 A1 | 5/2007 | Sakamoto | |
| 2007/0130754 A1 | 6/2007 | Fein | |
| 2007/0171129 A1 | 7/2007 | Coleman et al. | |
| 2007/0188327 A1 | 8/2007 | Keeton et al. | |
| 2007/0246843 A1 | 10/2007 | Yang et al. | |
| 2008/0047130 A1 | 2/2008 | Lin et al. | |
| 2008/0083706 A1 | 4/2008 | Kirmeier | |
| 2008/0103238 A1 | 5/2008 | Braidwood et al. | |
| 2008/0120834 A1 | 5/2008 | Laksin et al. | |
| 2008/0128397 A1 | 6/2008 | Gandhi | |
| 2008/0128493 A1 | 6/2008 | Jones et al. | |
| 2008/0217309 A1 | 9/2008 | Rodgers | |
| 2008/0277069 A1 | 11/2008 | Tharp | |
| 2009/0033582 A1 | 2/2009 | Blenkhorn | |
| 2009/0230196 A1 | 9/2009 | Johnson et al. | |
| 2010/0071831 A1 | 3/2010 | Peters et al. | |
| 2010/0089535 A1 | 4/2010 | Hosono et al. | |
| 2010/0103238 A1 | 4/2010 | Neuhard et al. | |
| 2010/0320275 A1 | 12/2010 | Fu | |
| 2011/0220276 A1 | 9/2011 | Coleman et al. | |
| 2012/0060359 A1 | 3/2012 | Forster et al. | |
| 2012/0061473 A1 | 3/2012 | Forster et al. | |
| 2012/0064307 A1 | 3/2012 | Forster et al. | |
| 2012/0280047 A1 | 11/2012 | Forster et al. | |
| 2014/0034739 A1 | 2/2014 | Forster et al. | |
| 2014/0047703 A1 | 2/2014 | Forster et al. | |

FOREIGN PATENT DOCUMENTS

| | | |
|---|---|---|
| CN | 101 375 463 | 2/2009 |
| CN | 101 541 555 | 9/2009 |
| CN | 101 297 307 | 6/2010 |
| DE | 37 32 825 | 3/1988 |
| DE | 4000372 | 7/1991 |
| DE | 4422338 | 6/1994 |
| DE | 200 05 940 | 8/2000 |
| DE | 696 17 753 | 8/2002 |
| EP | 0 665 705 | 8/1995 |
| EP | 790123 | 2/1997 |
| EP | 1120796 | 8/2001 |
| GB | 869076 | 5/1961 |
| JP | 6334704 | 12/1994 |
| JP | H07100793 | 4/1995 |
| JP | 2001127410 | 5/2001 |
| JP | 4334704 | 9/2009 |
| TW | 2008/11717 | 3/2008 |
| WO | 9951386 | 10/1999 |
| WO | 2001/054058 | 7/2001 |
| WO | 2001/054226 | 7/2001 |
| WO | 2003/024708 | 3/2003 |
| WO | 2003/054708 | 7/2003 |
| WO | 2003/107266 | 12/2003 |
| WO | 2005/083627 | 9/2005 |
| WO | 2005/089143 | 9/2005 |
| WO | 2007/053355 | 5/2007 |
| WO | 2007/087189 | 8/2007 |
| WO | 2008148527 | 12/2008 |
| WO | 2009118455 | 10/2009 |

OTHER PUBLICATIONS

"Finecut Laser Cutting Systems," Spartanics®, www.spartanics.com, 4 pages, no date shown.
"Fineprint Flatbed Screen Printing Line, Roll-to-Roll," Spartanics®, www.spartanics.com, 2 pages, no date shown.
"Cold Foil for Dummies®," J. Michael Rivera, Wiley Publishing, Inc., copyright 2004.
International Search Report and Written Opinion dated Oct. 6, 2011 for International Application No. PCT/US2011/040379.
International Search Report and Written Opinion dated Oct. 6, 2011 for International Application No. PCT/US2011/040383.
International Search Report and Written Opinion dated Oct. 6, 2011 for International Application No. PCT/US2011/041743.
International Search Report and Written Opinion dated Oct. 6, 2011 for International Application No. PCT/US2011/040391.
Partial European Search Report dated May 16, 2014 for International Application No. EP13005668.
International Search Report dated Sep. 26, 2007 for Internation Application PCT/US2007/001048 filed Jan. 16, 2007.
IWritten Opinion dated Mar. 20, 2008 for Internation Application PCT/US2007/001048 filed Jan. 16, 2007.
International Preliminary Report on Patentability dated May 2, 2011 for Internation Application PCT/US2007/001048 filed Jan. 16, 2007.
Extended European Search Report dated Feb. 9, 2010 for European Appllication EP 07 76 2542.
Definition of RFID, Technology.com, printed Mar. 18, 2014, 1 page.
European Search Report dated Feb. 16, 2016 for International Application No. EP13 00 5668.
International Search Report and Written Opinion dated Jan. 12, 2012 for International Application No. PCT/US2011/040386 filed Jun. 14, 2011.
International Preliminary Report on Patentability dated Dec. 14, 2012 for International Application No. PCT/US2011/040386 filed Jun. 14, 2011.

* cited by examiner

PRODUCTION LINE FOR MAKING SHORT RUN RADIO FREQUENCY IDENTIFICATION TAGS AND LABELS

CROSS-REFERENCE TO RELATED APPLICATION

The present application is a divisional of U.S. patent application Ser. No. 13/160,318 filed Jun. 14, 2011, which claims the benefit of U.S. Provisional Application Nos. 61/354,380 filed Jun. 14, 2010, 61/354,388 filed Jun. 14, 2010, and 61/354,393 filed Jun. 14, 2010, all of which are incorporated herein by reference in their entireties.

FIELD

The present invention is found in the field of manufacturing radio frequency identification ("RFID") devices. More particularly the present invention relates to a method, system and apparatus for producing RFID tags, labels, tickets, brochures and other printed materials in short production runs.

BACKGROUND

RFID devices can be produced in a number of different methods and commonly include some sort of chip attachment to an antenna which is then used to make an RFID device. The chip can be attached either through the use of a strap or may be applied directly to the antenna. The antenna is a conductive material which may be produced by etching, die cutting or printing of conductive ink on a substrate.

Conductive laminates such as foil laminates are used in a number of applications, ranging from containers for microwave packages to smart cards. Such laminates have regularly been created by die cutting, stamping, and other mechanical processes that generally lend themselves well to high speed situations in which a relatively simple shape or pattern can be created.

The increased demand for circuits has created a need for a manufacturing method that can quickly and efficiently produce such circuits. Once such method is disclosed in U.S. Patent Application No. 2007/0171129 A1. This method includes the steps of providing a reinforced metal foil laminate, having a metal foil layer bonded to a reinforcement layer, and a carrier layer bonded to the metal foil laminate. The method includes the step of using a rotary die cutter to cut an antenna pattern through the metal foil laminate to the carrier layer. The method concludes by removing an undesired matrix portion of the reinforced metal foil laminate to provide a metal foil laminate antenna disposed on the carrier layer.

A rotary die cutter has been used to produce various structures because it is both fast and inexpensive. However, rotary die cutters have poor resolution and are currently limited to having a minimum distance between cut lines of about 1 mm. An additional problem with using a rotary die cutter to cut a construction requiring high precision and tolerance is that the cylindrical die used by the rotary die cutter cannot be quickly or easily changed. Accordingly, the design is not readily changeable, and thus it is often not economically feasible to produce small batches of a particular design because of the need to constantly change out die heads. Furthermore, any change in design would require a large lead-time, as a new cylindrical die must be manufactured each time the design is changed. This can create a large inventory of die heads, the storage of which can occupy valuable factory floor space.

What is needed therefore is a method and apparatus that can produce small batch of RFID devices in a finished format that is ready to use and relatively inexpensive so that RFID device manufacturing can be co-located with the manufacturing of consumer goods such as apparel items.

BRIEF SUMMARY

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention provides a method, system and apparatus for producing RFID devices in small batches or a short run format and in a collocated environment with a consumer goods production facility.

In one exemplary embodiment of the present invention, a method for producing a ready to use RFID device for consumer goods is described and includes the steps of providing a substrate, with the substrate having first and second faces. Then applying a pattern of adhesive to the first face of the substrate and laminating a conductive foil to the pattern of adhesive. Next, the conductive foil is cut to form to form a plurality of antenna patterns. A chip is applied to each of the antenna patterns. Then, printing is applied on the second face of the substrate to create distinct printed areas. Each of the chips is encoded and placed on each of the antenna patterns. Each of the distinct printed areas is read and the information is matched with each of the distinct printed areas to information encoded in each of the chips. Finally, each of the distinct printed areas are separated from the substrate.

In a still further exemplary embodiment of the present invention, an apparatus for producing a ready to use RFID device for consumer goods is described and includes a supply of material and a supply of conductive material. An adhesive coating station for applying a pattern of adhesive to the supply of material. A laminating station for laminating the supply of conductive material to the pattern of adhesive. A first cutting device for cutting an antenna pattern in the conductive material. A first printing device for printing human and or machine readable indicia on the supply of material. A chip placement device for placing a chip on the antenna pattern to form an RFID device and an encoding station for encoding information on to the chip. The apparatus also includes a computer for comparing the information the encoded information with the human and/or machine readable indicia.

In a yet further embodiment of the present invention, an intermediate assembly of a plurality of ready to use RFID devices for consumer goods is described and includes a substrate that has a plurality of distinct antenna patterns, with each antenna pattern including a conductive foil formed by one of laser cutting or cold foil processing. A pattern of adhesive is coextensive with the antenna pattern and a substrate on which the adhesive pattern and antenna pattern are disposed. A plurality of chips, with each of the chips being encoded with information and each of the chips is connected to one of the plurality of antenna patterns. A plurality of printed areas provided on the substrate, each of the printed areas in association with one of the plurality of antenna patterns forming an RFID device. The printed indicia matches the information encoded on each of the plurality of chips. Each of the RFID devices is removable from the substrate to form a plurality of ready to use RFID devices.

In a still further exemplary embodiment of the present invention, a system for producing ready to use RFID devices is described and includes a manufacturing location for producing consumer goods. A computer for determining types of consumer goods being produced and for providing instructions for creating and encoding RFID devices for use in association with the consumer goods.

Continuing with a description of the presently described embodiment, an RFID production unit is provide for use with the system, the RFID production unit including a supply of material and a supply of conductive material. An adhesive coating station for providing an adhesive pattern. A laminating station for laminating the conductive material to the adhesive pattern. A cutting station for cutting an antenna pattern to substantially match the adhesive pattern. A chip attaching station for attaching the chip to the antenna pattern. A printing station for printing human and or machine readable indicia on the supply of material. A reader for reading information encoded on the chip and for matching the information to the human and or machine readable indicia. The RFID production unit and manufacturing location are collocated with one another.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

The present invention provides for the production of small batches of RFID devices, that can be produced in short runs, production runs ranging from one RFID device to perhaps a thousand separate units. The method, apparatus and system of the present invention can be used to create a plurality of individual RFID devices that can either change device configuration from device to device or may produce a specific number of a particular unit, then change configurations to complete a particular order requested by an end user. For example, a customer may request fifty units of a first type of RFID device and then 100 units of a second type of RFID device.

Figure 1:
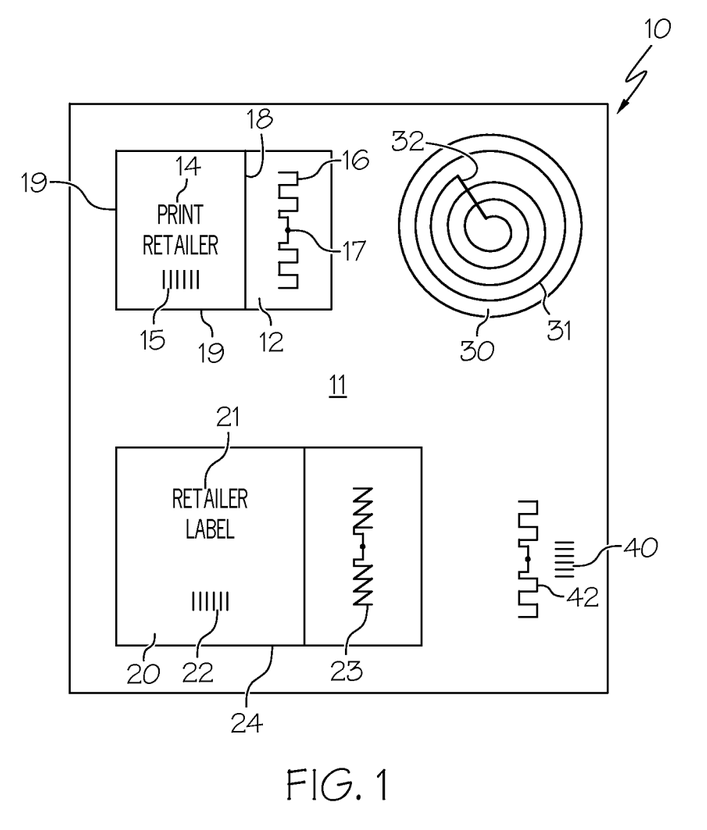
FIG. 1 depicts a front view of an exemplary intermediate assembly produced in accordance with the method and system of the present invention.

Reference is now directed to FIG. 1 of the present invention which shows an intermediate 10. As used herein, the term intermediate refers to a product that undergoes one or more processing steps in order to provide a finished product. For, example with reference to the current FIG. 1, a plurality of discrete or distinct printed areas 12, 20 and 30 that include RFID devices are provided on a sheet 11 which may subsequently be severed or otherwise removed from the sheet. Certain RFID devices, such as 20 which is a label, may have an adhesive coating (not shown) applied prior to being used. RFID device 12 may undergo a folding step along fold line 18 and then an attaching step to connect the device 12 to a consumer good.

The discrete or distinct printed areas distinct printed areas 12, 20 and 30 are selected from a group including tags, labels, hang tags, badges, shelf talkers, flyers, brochures, marketing collateral, tickets, cards and combinations thereof.

Sheet 11 has a front face which is shown in FIG. 1 and a rear face which is not shown. The sheet 11 is provided with indicia and in this example includes machine readable information 40 and an RFID device 42. The indicia 40 and RFID device 42 can be used to help track a particular job or production order or to provide instructions to the apparatus to produce the particular order being contemplated. The code and RFID device can be read by machine such as a bar code scanner or RFID reader.

The intermediate 10, still referring to FIG. 1, as previously indicated includes the sheet 11 and several distinct printed areas 12, 20 and 30 to be used for a particular application. First area, or hang tag intermediate 12 in this example, shows human readable indicia 14 and machine readable indicia 15 (bar code) on a first side and a RFID antenna 16 and chip 17 on the second side. The human and machine readable indicia as shown may relate to retailer information, brand information, pricing or any information that the particular customer requires. The two sides are separated by a fold line 18. Tag 12 is held to the sheet 11 by a series of ties 19 which are created when the sheet 11 is perforated around the perimeter of the tag. The perforations 19 are shown extending around the perimeter and can be easily broken so as to separate the tag 12 from the sheet 11 and then subject to further processing, e.g. folding and attaching to a consumer good.

The next distinct printed area 20 shown in FIG. 1 is depicted as a label intermediate. The label intermediate 20, again has human readable indicia 21 and machine readable indicia 22 which again can relate to any information that has been requested by the customer for whom the order is being created. The label intermediate 20 also has an RFID device 23. It should be pointed out that the RFID device 23 of label intermediate 20 is different than the RFID device 16/17 of hang tag intermediate 12 further illustrating the flexibility of the present invention. That is, one intermediate assembly can have a first RFID device design and another intermediate assembly can have a different RFID device design.

The label intermediate 20 is also held in place in the sheet 11 by a series of ties 24 which again allow for the label intermediate 20 to be readily and easily separated from the sheet 11 when required for use or further processing.

The final intermediate assembly 30 shown on sheet 11 of FIG. 1, provides a high frequency (HF) RFID label. This is further distinct from the RFID devices shown in connection with distinct printed areas 12 and 20, which for example may be ultra high frequency labels (UHF). The HF device includes a plurality of coil windings 31 and a chip/bridge 32 connecting each end of the coil to complete the circuit.

Figure 2:
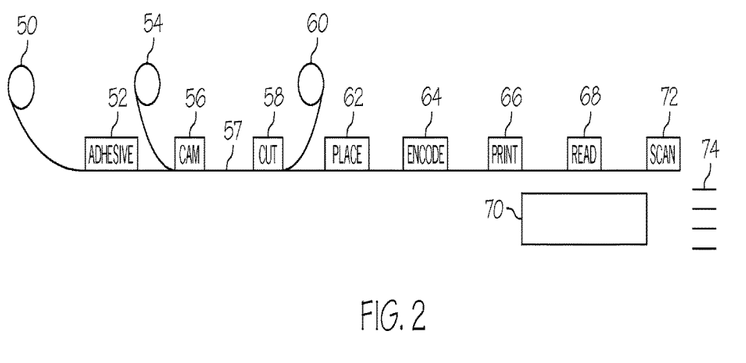
FIG. 2 provides a schematic of an exemplary apparatus used in connection with practicing the present invention.

Reference is now directed to FIG. 2 of the presently described invention. The schematic starts with a supply of material 50. The supply of material 50 may be selected from one of paper, woven fabric, non-woven fabric or plastic. While the supply of material 50 has been depicted as a continuous roll of material, it should be understood that the supply may consist of one or more pre-cut sheets and, the invention may be practiced in a sheet feed configuration.

The supply of material or web 50 is fed to an adhesive applicator 52. The adhesive, which may be a pressure sensitive or other suitable adhesive, can be applied in a pattern that will be in the shape or form of the antenna used for the RFID device that will be formed as seen in connection with FIG. 1 of the intermediate sheet or may be full or flood coated on to the supply 50 which will then later undergo a curing process to create tacky and non-tacky areas, with the tacky areas corresponding to the antenna patterns that are to be created. The curing can be done by UV energy or other suitable process.

The present invention contemplates that the adhesive may include optical brighteners. In a preferred embodiment, the optical brighteners are a fluorescent powder that is approximately 1% by weight of the adhesive and more preferably about 0.5% by weight of the adhesive. Other triggers or signals can be used to initiate the laser and register the patterns to be formed in the web such as cuts or slits in the web, taggant inks, printing inks and the like.

The optical brighteners may be provided in the area where the cutting of at least one pattern for a foil or conductive laminate is to occur in the foil laminate layer. The optical brighteners may be printed on top of the adhesive layer rather than mixed within the adhesive layer. Additionally, it is contemplated by the present invention that the optical brighteners may be printed on top of the substrate as opposed to mixed or on top of the adhesive layer. In this embodiment, it is preferred that the adhesive layer is clear or transparent so that the optical brighteners may be seen through the adhesive layer.

Additionally, in one embodiment of the present invention, optical brighteners may be printed in the shape of the foil or conductive laminates that are going to be constructed out of the foil or conductive layer or material.

Next, a supply of conductive material 54, such as a foil, alloy or conductive ink on a transfer sheet is passed to be in juxtaposition with the first supply 50. The conductive material 54 is then laminated in part to the supply 50 by laminating station 56. The partial lamination occurs only the in the areas of the adhesive pattern or the tacky portions of the adhesive pattern. As the foil is not fully laminated to the web, the foil creates a 100% fully recyclable material when removed as the foil is not contaminated with adhesive or has portions of the substrate connected to the foil.

Continuing with a discussion of FIG. 2, the combined web 57 is then fed to a cutting or antenna forming station 58. The cutting or forming may be accomplished by one of die cutting, laser cutting or cold foil processing. The cutting or forming station may also have multiple elements, such as a first die cutting or cold foil process and then laser cutting. As used herein an exemplary cold foil process refers to printing an adhesive or other curable pattern onto a substrate then applying a foil layer over the pattern, laminating the foil to the pattern so that the foil sticks to the pattern and then stripping away the foil, leaving the pattern on the substrate covered with the foil layer.

Once the antenna pattern is formed by the cutting forming station 58, the remaining matrix of material is rewound at station 60. The now partially laminated web 57, partially laminated as it has the conductive patterns of material adhered to the supply 50, but the remaining amount of material has been removed. The web 57 then moves the chip or strap placement station 62 where a chip or strap is placed on the antenna to complete the assembly of the RFID device. Next, the RFID device (chip or strap) is encoded at station 64 with information relating to the product to which the discrete printed area (see FIG. 1) is to be associated (attached, adhered, etc.)

Continuing with a discussion of FIG. 2, the web 57 then travels to a printing station 66 where human and or machine readable indicia is provided on the web (see FIG. 1). The indicia is printed in each of the discrete areas and may also be printed on the margins of the web. Once the printing is complete, the encoded RFID devices and indicia are read and/or scanned, respectively at station 68. In the event that the reading/scanning reveals that the information encoded on the RFID device and printed indicia do not match, the discrete printed area is discarded into discard area 70. This may be accomplished by punching out the discrete printed area such as by a rotary punch, plunger or other suitable device. The remaining web 57 having one or more discrete areas where the encoding and the printed indicia match, is then passed to a separation station 72. Each of the discrete areas are then collected at station 74 and may then be shipped or otherwise delivered to the end user that requested the particular order.

Figure 3:
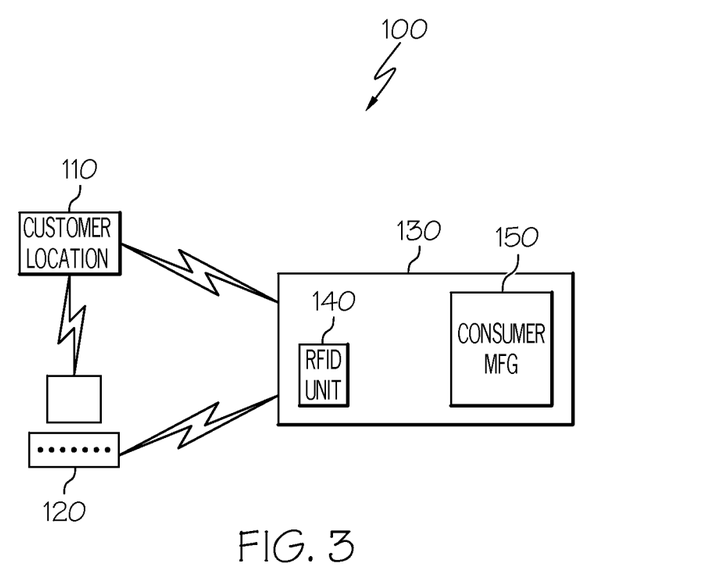
FIG. 3 shows a schematic of an exemplary system used in connection with practicing the present invention.

Turning now to FIG. 3 an exemplary system for use in procuring products in connection with the present invention is presented and is referenced generally by numeral 100. The system 100 includes a first location 110, such as a customer location, which may be a company headquarters, distribution or procurement location or other site where ordering and processing products is performed. The first location 110 is connected via a global communications network 120 to a second location 130, which may include for example assets for producing consumer products 150 and an RFID production unit 140. Ideally, both the RFID production unit 140 and the consumer products manufacturing assets 150 are collocated, but it should be understood that the two units 140 and 150 may be at distinct physical locations but connected by a communications systems to allow the units to easily and readily communicate with one another.

The system 100 of the present invention will start with an order for consumer goods or other products emanating the first location or customer location 110. The order will be sent the global communications network 120 to the second location 130 that houses, in this example, both the RFID production unit 140 and the assets 150 that are used in the manufacturing the product that is the subject of the order generated by the first location 110.

The order will be received by the second location 130 which will commence a sequence of generation of intermediates as provided in FIG. 1, as well as the production of consumer goods or other products. As the consumer goods or products are created by the manufacturing assets 150 and are collected, the discrete printed areas of FIG. 1 are separated and attached to the consumer goods or other products. The attachment includes the removal of each of the discrete printed areas that are held by ties as discussed above in the sheet of the intermediate, and then connected to the consumer goods such as by adhering, affixing, or otherwise attaching. Once the tags are associated with the consumer goods, the goods can then be shipped to the first location 110 or to another location that has been designated in the order that initiated the sequence.

Figure 4:
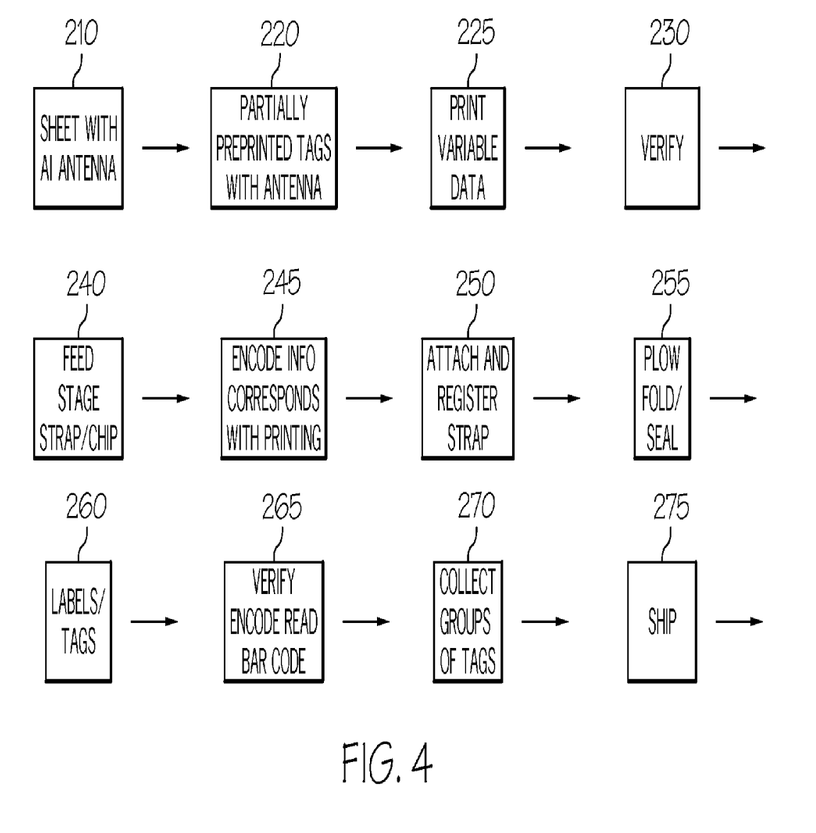
FIG. 4 illustrates a block diagram setting forth an exemplary method of practicing the present invention.

Reference is now directed to FIG. 4 in which a block diagram showing an exemplary method of producing a finished RFID device or intermediate (as shown in FIG. 1) is provided. The process commences for example at step 210 in which a supply of material is provided. It should be understood that the supply of material can be provided in either a continuous format, such as a roll of material, or in a cut sheet format, where a stack of sheets are provided to the apparatus to provide the supply. The supply of material may have a plurality of antennas for use in forming the RFID devices. The antennas that are provided may have a generic pattern that will need to be further cut or modified in order to produce the final antenna pattern that is sought. Alternatively, a supply of blank material can be provided and conductive material then subsequently adhered and attached to the substrate to make the antenna supply.

Where the supply of material is provided with a first antenna structure of a particular format that antenna structure can be further modified such as by cutting with a laser cutter or mechanical die cutter. In this manner, a large pre-formed stock can be created that can be tailored to meet a number of applications thereby meeting the needs of a large number of customer applications. For example, the assembly created using the apparatus of FIG. 2 can be fed into the process of FIG. 4 and further modified as described above by laser cutting.

It should be understood, that FIG. 4 provides for the processing of a particular supply of material and that the apparatus used in connection with the forming of the intermediates, including the steps of applying an adhesive, creating a pattern, laminating a foil layer to the adhesive pattern, cutting of the pattern and other associated steps are intended to be included in the present method and that for the sake of brevity the steps are not necessarily repeated herein.

Next, at step 220 a first printing of fixed indicia can occur. For example, this printing can include such things as the name of the retailer, or other information that does not change from tag to tag. At step 225, variable information is provided to the material. The variable information may for example be a size, color, price or such other information that may change from tag to tag. Next, the information contained in the variable information 230 is verified by scanning, or other reading of the information. The information can be both human and machine readable indicia.

The printing that is provided can be accomplished by any number of suitable printing methods, such as non-impact, e.g. ink jet, ion deposition, laser printing, impact printing, thermal transfer or such other process as may be requested by the consumer or may lend itself to the production of intermediates and tags/labels as required herein.

At step 240, RFID chips which may also be provided in a strap configuration are fed to the supply of material. Then each of the chips or chips with straps are encoded at step 245 with information that corresponds to the variably printed information and, when required also the fixed information provided earlier in the process. That is, as each discrete portion of the supply as shown in FIG. 1 is provided with unique indicia, the chips are also encoded with unique indicia relating to the products with which the RFID chips are to be associated.

Once the chips have been encoded at step 240, the chips or chips in a strap format are provided to the supply of material and attached at step 250. The chips/straps are attached in registry with the chip attachment point of the antenna.

Next, for example when hang tags are being created, the supply of material is plow folded or sealed at step 255. That is, with respect to plow folding, one panel is folded over on top of the other so as to create a closure assembly. Alternatively, if a label arrangement is provided, an adhesive may be applied to the web and sealed to the web. The adhesive may be applied as part of a transfer tape construction, adhesive and liner. In a transfer tape configuration, the adhesive will have a greater affinity for the supply of material as opposed to the liner such that the adhesive will remain with the supply of material and not the liner when the adhesive is needed for use.

The final format of the discrete areas to be created is done at step 260, and an area around the RFID device and printing is created to facilitate separation later as shown in FIG. 1. At step 265 the encoding of the RFID chips and printing is verified to ensure that the RFID chips and printing correspond to one another. If there is no match between the encoded information on the chips and the information printed on the tags, the tags or discrete printed areas can be removed from the supply of material or alternatively can be marked so show that the tag is defective so that it will not be used at a later time.

Next, at step 270 the discrete printed areas or now tags or labels are collected so that they can be shipped or delivered at step 275 to the manufacturing location where the consumer goods and the RFID production device are located.

It will thus be seen according to the present invention a highly advantageous method, system and apparatus has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. A continuous radio frequency identification (RFID) production line for producing an RFID device comprising:

a supply of material advancing in a machine direction;

a supply of conductive material, each of the supply of material and conductive material are advanced in the machine direction;

a combination web which advances in the machine direction;

an adhesive coating station for applying a pattern of adhesive to the supply of material;

a laminating station for laminating the supply of conductive material to the pattern of adhesive;

a first cutting station for cutting an antenna pattern in the conductive material, such that the first cutting station has a first die cutting or cold foil process and then laser cutting;

a first printing device for printing human and/ or machine readable indicia on the supply of material;

a chip placement device for placing a chip on the antenna pattern to form the RFID device;

an encoding station for encoding unique information on to the chip that relates to a product associated with the chip;

a discrete printed area; and a reading and/or scanning station for comparing the encoded information with the human and/or machine readable indicia; where the discrete printed area is removed when information encoded on the chip does not match the human and/or machine readable indicia in the discrete area, such that the production line can produce an intermediate assembly having at least an RFID device disposed in a label or hang tag.

2. The RFID production line of claim 1, including a discard station after the reading and/or scanning station for discarding a faulty RFID device.

3. The RFID production line of claim 1, wherein the chip placement device is provided by one of a strap or direct chip attach device.

4. The RFID production line of claim 1, wherein the first cutting station is one of a laser cutter or cold foil process.

5. The RFID production line of claim 1, including a second printing station to provide one of conductive ink to the conductive material or additional human and or machine readable indicia.

6. The RFID production line of claim 1, wherein the chip placement device is provided with a supply of straps or chips on a web.

7. A continuous radio frequency identification (RFID) production line for producing an RFID device comprising:

a supply of material advancing in a machine direction;

a supply of conductive material each of the supply of material and conductive material are advanced in the machine direction;

an adhesive coating station for applying a pattern of adhesive to the supply of material;

a laminating station for laminating the supply of conductive material to the pattern of adhesive;

a first cutting station for cutting an antenna pattern in the conductive material, such that the first cutting station has a first die cutting or cold foil process and then laser cutting;

a first printing device for printing fixed information on the supply of material and variable information on the supply of material;

a chip placement device for placing a chip on the antenna pattern to form the -RFID device;

an encoding station for encoding information on to the chip;

a discrete printed area; and a reading and/or scanning station for comparing the encoded information with the fixed and variable information and if information on the chip does not match the fixed and variable information, the device is marked to indicate that the device is defective; and the discrete printed area is removed;

such that the product line can produce an intermediate assembly having an RFID device in a label or a hang tag.

* * * * *